United States Patent
Kuroki et al.

(10) Patent No.: US 8,384,335 B2
(45) Date of Patent: Feb. 26, 2013

(54) MOTOR DRIVING APPARATUS HAVING DC LINK VOLTAGE REGULATING FUNCTION

(75) Inventors: Wataru Kuroki, Minamitsuru-gun (JP); Takashi Harada, Minamitsuru-gun (JP); Shinichi Horikoshi, Minamitsuru-gun (JP); Yasusuke Iwashita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 26 days.

(21) Appl. No.: 13/208,553

(22) Filed: Aug. 12, 2011

(65) Prior Publication Data
US 2012/0056568 A1 Mar. 8, 2012

(30) Foreign Application Priority Data
Sep. 3, 2010 (JP) .................................. 2010-197925

(51) Int. Cl.
*H02P 27/04* (2006.01)
(52) U.S. Cl. ......... 318/800; 318/801; 318/811; 318/434
(58) Field of Classification Search .................. 318/599, 318/607, 609, 610, 638, 400.26, 400.3, 722, 318/723, 800, 801, 802, 811, 430, 433, 434
See application file for complete search history.

(56) References Cited

U.S. PATENT DOCUMENTS

| | | | |
|---|---|---|---|
| 5,373,223 A * | 12/1994 | Akagi et al. | 318/722 |
| 7,042,194 B1 * | 5/2006 | Kuroiwa et al. | 318/811 |
| 7,135,835 B2 * | 11/2006 | Yamada et al. | 318/800 |
| 7,372,174 B2 * | 5/2008 | Jones et al. | 290/44 |
| 8,008,885 B2 * | 8/2011 | Jones et al. | 318/800 |
| 8,228,008 B2 * | 7/2012 | Kitanaka | 318/45 |

FOREIGN PATENT DOCUMENTS

| | | |
|---|---|---|
| JP | 8-149855 | 6/1996 |
| JP | 10-257773 | 9/1998 |
| JP | 2001037248 | 2/2001 |

* cited by examiner

*Primary Examiner* — Walter Benson
*Assistant Examiner* — Thai Dinh
(74) *Attorney, Agent, or Firm* — Drinker Biddle & Reath LLP

(57) ABSTRACT

A motor driving apparatus comprises: an AC/DC converter which converts AC voltage supplied from an AC power source into DC voltage through PWM switching control of a power switching device; and a DC/AC converter which converts the DC voltage into variable-frequency AC voltage for driving a motor in a controlled manner. The AC/DC converter includes: a control unit which generates, based on an error between the DC voltage and a DC voltage command value, a PWM signal for the PWM switching control of the power switching device; and a frequency/gain varying unit which sets the frequency of the PWM signal to be generated by the control unit and a control gain in the control unit higher than their normal levels during a period in which a load in the DC/AC converter varies.

8 Claims, 4 Drawing Sheets

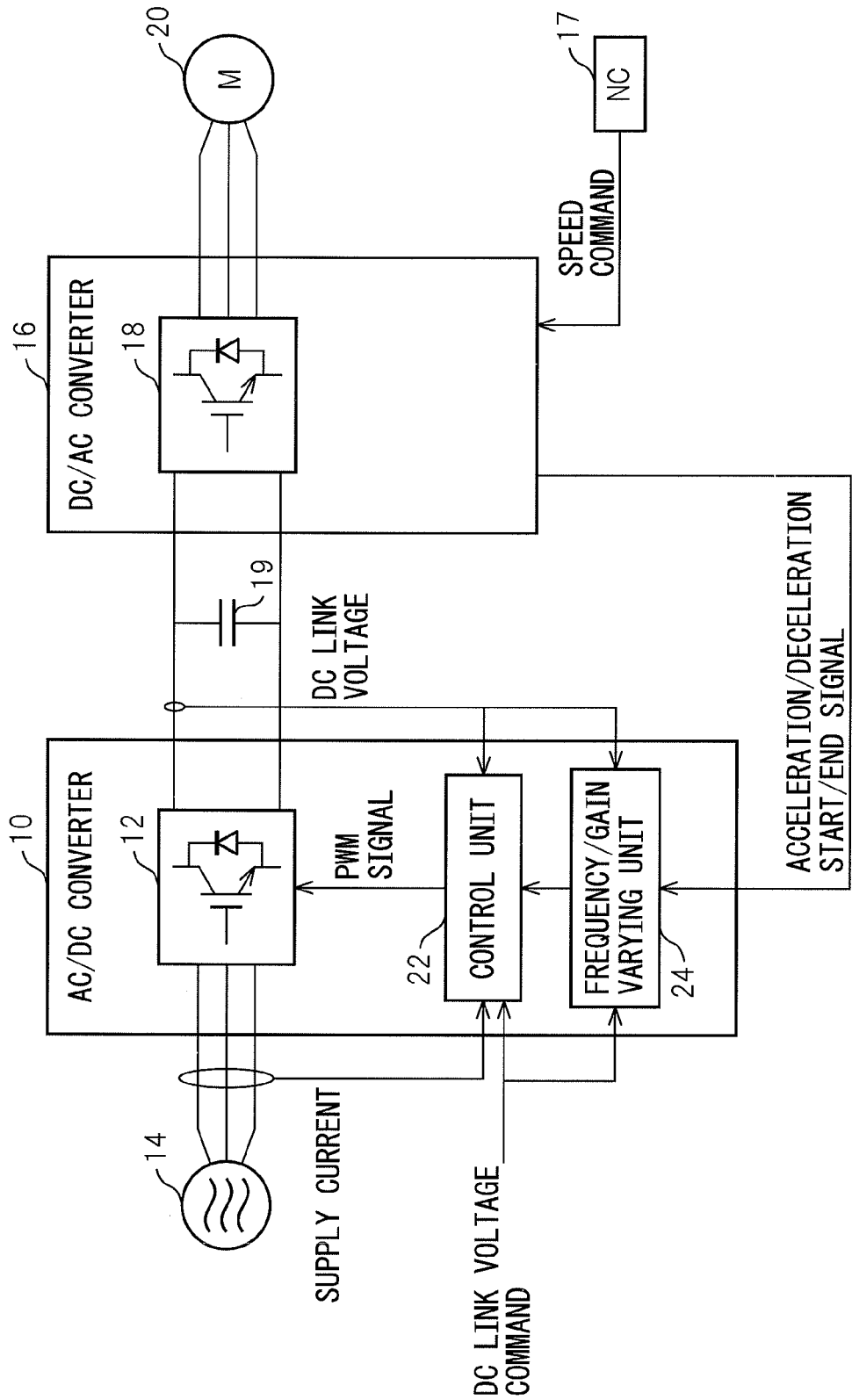

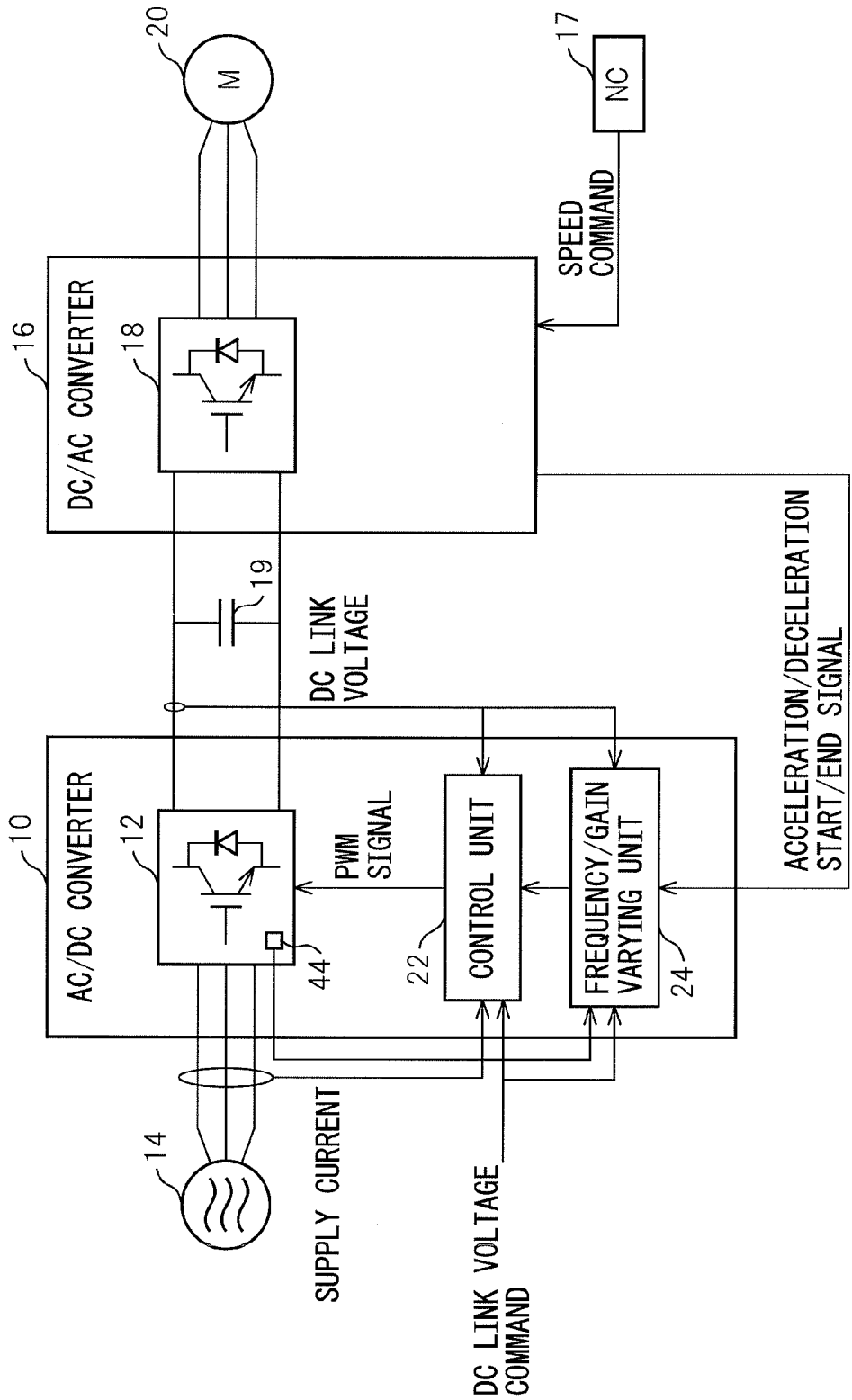

MOTOR DRIVING APPARATUS HAVING DC LINK VOLTAGE REGULATING FUNCTION

RELATED APPLICATION DATA

This application claims priority under 35 U.S.C. §119 and/or §365 to Japanese Application No. 2010-197925 filed Sep. 3, 2010, the entire contents of which is incorporated herein by reference.

BACKGROUND OF THE INVENTION

1. Field of the Invention

The present invention relates to a motor driving apparatus having a function for regulating DC link voltage by regulating control in an AC/DC converter when the load for a DC/AC converter changes suddenly during acceleration/deceleration of a motor.

2. Description of the Related Art

In a motor driving apparatus for driving a machine tool, industrial machine, robot, or the like, a method (a PWM converter method) may be employed that converts the waveform of an input current to a substantially sinusoidal waveform by applying PWM control, using a power switching device, to an AC/DC conversion operation for converting an AC voltage to a DC voltage.

The PWM converter method has the advantages of drastically reducing harmonics of the input current by increasing the PWM switching frequency and producing a variable DC output voltage.

Japanese Unexamined Patent Publication No. H10-257773 (JP10-257773A) discloses a technique for regulating the DC output voltage of a PWM converter apparatus by correcting the value of the integral term of a current command value so that the current command value becomes zero when the DC output voltage reaches an upper limit voltage value.

On the other hand, Japanese Unexamined Patent Publication No. H08-149855 (JP8-149855A) discloses a technique for suppressing variation in the DC link voltage due to a sudden change in load by making provisions to supply a motor speed command value to an AC/DC converter before supplying it to a DC/AC converter.

However, as described in Japanese Unexamined Patent Publication No. H10-257773 (JP10-257773A), the PWM converter method has the disadvantage that, during motor acceleration/deceleration, the output DC voltage (DC link voltage) changes and becomes unstable as the load in the AC/DC converter changes suddenly.

One possible approach to addressing this problem is to increase the loop gain, such as a voltage control gain or current control gain, thereby increasing the response of PWM control and enhancing the stability of the DC link voltage. In this case, the PWM switching frequency is also increased, because if the gain were simply increased, the control loop would oscillate. However, since the temperature of the power switching device rises in proportion to the increase in PWM switching frequency, it is not always possible to maintain the high PWM switching frequency for a prolonged period of time.

An object of the present invention is to provide a motor driving apparatus having a function that can regulate the DC link voltage while suppressing temperature rise in the power switching device.

SUMMARY OF THE INVENTION

According to the present invention, a motor driving apparatus comprising: an AC/DC converter which converts an AC voltage supplied from an AC power source into a DC voltage through PWM switching control of a power switching device; and a DC/AC converter which converts the DC voltage into a variable-frequency AC voltage for driving a motor in a controlled manner, and wherein the AC/DC converter includes: a control unit which generates, based on an error between the DC voltage and a DC voltage command value, a PWM signal for the PWM switching control of the power switching device; and a frequency/gain varying unit which sets the frequency of the PWM signal to be generated by the control unit and a control gain in the control unit higher than normal levels during a period that a load for the DC/AC converter varies is provided.

The frequency/gain varying unit, for example, sets the frequency and the gain higher than the normal levels prior to starting acceleration or deceleration of the motor whose driving is controlled by the DC/AC converter, and sets the frequency and the gain back to the normal levels upon completion of the acceleration or deceleration.

By thus increasing the frequency and the gain to enhance the response only for the period during which the DC link voltage may become unstable due to the variation of the DC/AC converter load, not only does the response during the load variation improve, but the temperature rise is also held to a minimum.

BRIEF DESCRIPTION OF THE DRAWINGS

The above and other objects, features, and advantages of the present invention will become more apparent from the description of the preferred embodiments as set forth below with reference to the accompanying drawings, wherein:

FIG. 3 is a block diagram showing the configuration of a motor driving apparatus according to a second embodiment of the present invention; and FIG. 4 is a block diagram showing the configuration of a motor driving apparatus according to a third embodiment of the present invention.

DETAILED DESCRIPTION

Figure 1:
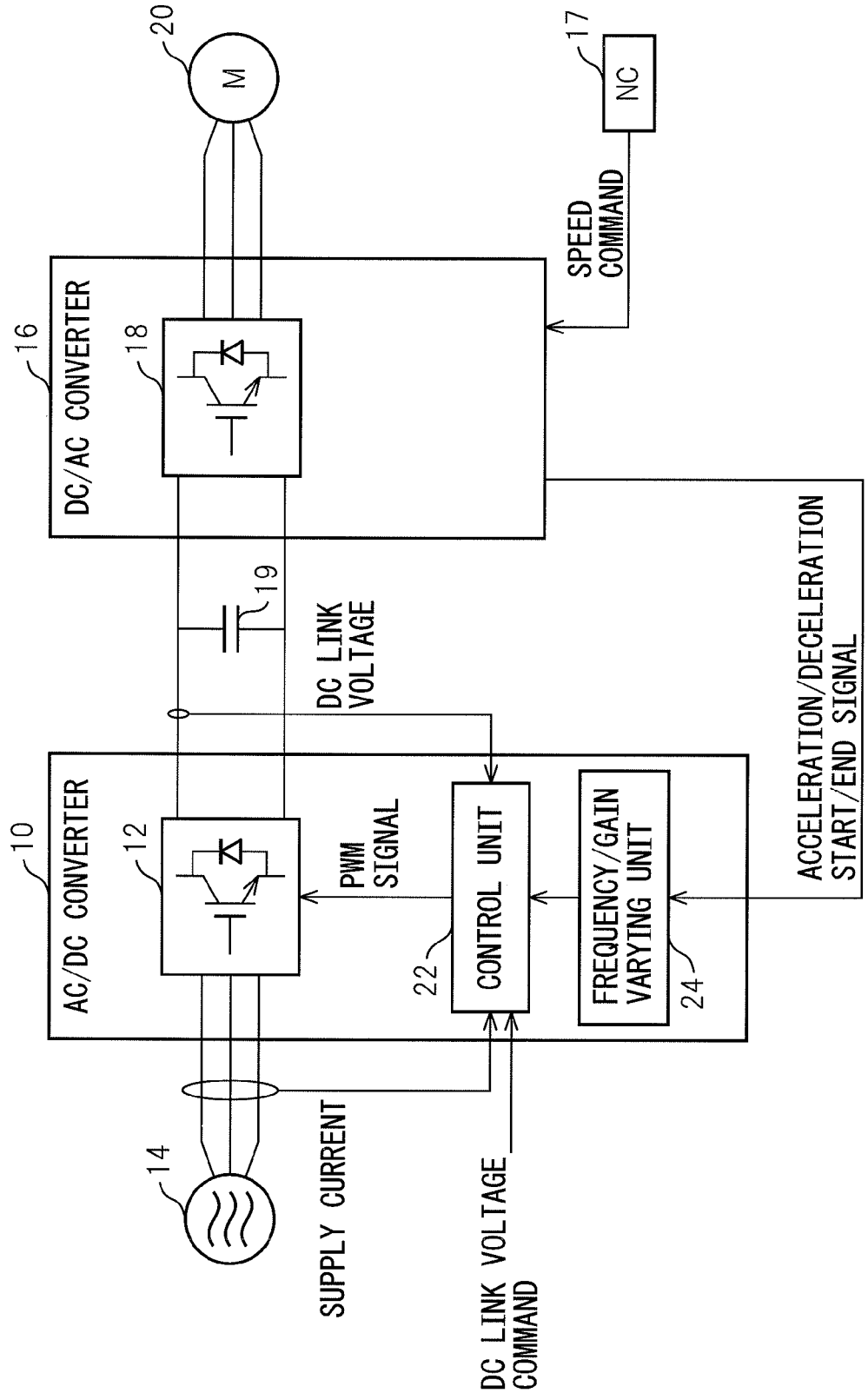
FIG. 1 is a block diagram showing the configuration of a motor driving apparatus according to a first embodiment of the present invention.

Embodiments of the present invention will be described in detail below with reference to the accompanying drawings. Throughout the drawings, the same component elements are designated by the same reference numerals.

Referring to the drawings, FIG. 1 is a block diagram showing the configuration of a motor driving apparatus according to a first embodiment of the present invention. An AC/DC converter 10 converts, through switching control of a power switching device 12, an AC voltage supplied from an AC power source 14 (in this case, a three-phase AC power source) into a DC voltage for output. A DC/AC converter 16 controls the switching operation of a power switching device 18 in accordance with a speed command from an NC apparatus 17, and thereby converts the DC voltage supplied from the AC/DC converter 10 into an AC voltage of a frequency corresponding with the speed command in order to drive a motor 20.

The AC/DC converter 10 includes a control unit 22 and a frequency/gain varying unit 24. The control unit 22 generates a PWM signal for the PWM control of the power switching device 12, based on an error between the DC voltage, i.e., the DC link voltage, output from the AC/DC converter 10 and a DC link voltage command, and on the value of a current from the power source 14. The frequency/gain varying unit 24 varies the control loop gain in the control unit 22 and the frequency of the PWM signal to be output from the control unit 22, in such a manner that, when an acceleration/deceleration start signal is received from the DC/AC converter 16, the loop gain and the frequency is set higher than their normal levels and, when an acceleration/deceleration end signal is received, the loop gain and the frequency are set back to their normal levels.

The acceleration/deceleration start signal and acceleration/deceleration end signal to be supplied to the frequency/gain varying unit 24 are generated, for example, in the DC/AC converter 16. As described above, the DC/AC converter 16 outputs an AC voltage whose frequency corresponds with the speed command supplied from the NC apparatus 17. When the speed command is changed, the DC/AC converter 16 first sends the acceleration/deceleration start signal to the AD/DC converter 10, and then starts the control to accelerate or decelerate the motor 20. When the acceleration or deceleration control is complete, and the speed of the motor 20 becomes stable, the DC/AC converter 16 outputs the acceleration/deceleration end signal.

Since the control loop gain in the AC/DC converter 10 is set high for the period during which the DC/AC converter 16 is performing the acceleration or deceleration control and there is thus the possibility that the DC link voltage may become unstable due to the varying load of the DC/AC converter 16, the stability of the DC link voltage improves. To prevent oscillations from occurring due to the high loop gain, the frequency of the PWM signal is also set and held high during this period, but since the frequency is set back to the normal level at the completion of the acceleration or deceleration control, the temperature rise in the power switching device is held to a minimum.

Figure 2:
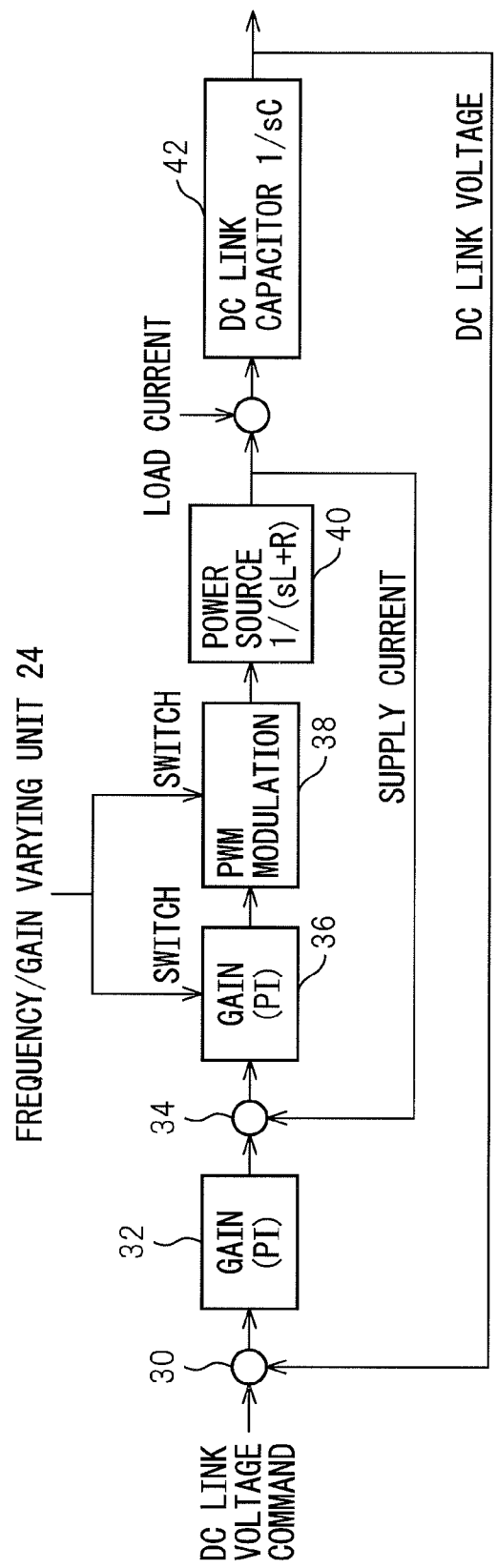
FIG. 2 is a block diagram illustrating control that is performed in an AC/DC converter.

FIG. 2 is a block diagram illustrating the control that is performed in the AC/DC converter 10. At node 30, an error between the DC link voltage and the DC link voltage command value is calculated, and in block 32, a supply current command value is calculated by PI calculations. At node 34, an error between the value of the supply current and the supply current command value is calculated, and in block 36, a PWM command value is calculated by PI calculations. In block 38, PWM modulation is performed by comparing the PWM command value with a triangular waveform of a constant frequency and outputting the result of the comparison. In block 40, the power source is modeled. In block 42, a DC link capacitor 19 (FIG. 1) is modeled.

The frequency/gain varying unit 24 (FIG. 1) sets the gain in block 36 higher than its normal level for the period starting from the time the acceleration/deceleration start signal is received and lasting until the time the acceleration/deceleration end signal is received. By thus increasing the gain of the current loop that starts from node 34 and returns to node 34 by passing through blocks 36, 38, and 40, the response of the PWM control is enhanced. To prevent oscillations from occurring due to the high loop gain, the frequency of the PWM signal in block 38 is also set and held high during this period. Since the frequency of the PWM signal is set high only for this period, the temperature rise in the power switching device is held to a minimum.

FIG. 3 is a block diagram showing the configuration of a motor driving apparatus according to a second embodiment of the present invention. In this embodiment, the actually measured value and the command value of the DC link voltage are also supplied to the frequency/gain varying unit 24. In addition to or instead of varying the frequency and the gain in accordance with the acceleration/deceleration start/end signals, the frequency/gain varying unit 24 calculates the error between the DC link voltage and the DC link voltage command value and compares the error with a first threshold value; if the error exceeds the first threshold value, the frequency and the gain in the control unit 22 are set higher than their normal levels by determining that the load is varying and, when the error decreases to or below a second threshold value which is smaller than the first threshold value, the frequency and the gain are set back to their normal levels. In this way, since the loop gain is set higher only for the period during which the load is varying and the link voltage becomes unstable, not only does the DC link voltage become stable, but also the temperature rise can be held to a minimum.

FIG. 4 shows a third embodiment of the present invention. In this embodiment, a temperature sensor 44 is attached to the power switching device 12 or to the heat sink on which the power switching device 12 is mounted, and the value of the temperature sensed by the temperature sensor 44 is supplied to the frequency/gain varying unit 24. When the temperature sensed by the temperature sensor 44 is higher than a predetermined value, the frequency/gain varying unit 24 maintains the frequency and the gain at their normal levels even during the period when the load is varying, and thereby prevents the temperature from further rising. Otherwise, this embodiment is the same as the first and second embodiments.

While the present invention has been described above with reference to the preferred embodiments thereof, those skilled in the art will understand that various changes and modifications can be made without departing from the scope of the appended claims.

The invention claimed is:

1. A motor driving apparatus comprising:
    an AC/DC converter which converts an AC voltage supplied from a power source into a DC voltage through PWM switching control of a power device; and
    a DC/AC converter which converts said DC voltage into a variable-frequency AC voltage for driving a motor in a controlled manner, and wherein
    said AC/DC converter includes:
    a control unit which generates, based on an error between said DC voltage and a DC voltage command value, a PWM signal for the PWM switching control of said power device; and
    a frequency/gain varying unit which sets the frequency of said PWM signal to be generated by said control unit and a control gain in said control unit higher than normal levels during a period that a load for said DC/AC converter varies, wherein said frequency/gain varying unit sets said frequency and said gain higher than said normal levels prior to starting acceleration or deceleration of said motor whose driving is controlled by said DC/AC converter, and sets said frequency and said gain back to said normal levels upon completion of said acceleration or deceleration.

2. A motor driving apparatus as claimed in claim 1, wherein said AC/DC converter further includes a temperature sensor for sensing the temperature of said power switching device, and wherein
    when the temperature sensed by said temperature sensor is higher than a predetermined value, said frequency/gain varying unit does not set said frequency and said gain higher than said normal levels even during the period that the load for said DC/AC converter varies.

3. A motor driving apparatus as claimed in claim 1, wherein said DC/AC converter sends an acceleration/deceleration start signal to said DC/AC converter when a commanded speed for said motor is changed, and sends an acceleration/deceleration end signal to said DC/AC converter when acceleration or deceleration control of said motor, responsive to said changed commanded motor speed, is complete, and wherein
   said frequency/gain varying unit sets said frequency and said gain higher than said normal levels in response to said acceleration/deceleration start signal, and sets said frequency and said gain back to said normal levels in response to said acceleration/deceleration end signal.

4. A motor driving apparatus as claimed in claim 3, wherein said AC/DC converter further includes a temperature sensor for sensing the temperature of said power switching device, and wherein
   when the temperature sensed by said temperature sensor is higher than a predetermined value, said frequency/gain varying unit does not set said frequency and said gain higher than said normal levels even during the period that the load for said DC/AC converter varies.

5. A motor driving apparatus as claimed in claim 3, wherein said DC/AC converter sends an acceleration/deceleration start signal to said frequency/gain varying unit when a commanded speed for said motor is changed, and sends an acceleration/deceleration end signal to said frequency/gain varying unit when acceleration or deceleration control of said motor, responsive to said changed commanded motor speed, is complete, and wherein
   said frequency/gain varying unit sets said frequency and said gain higher than said normal levels in response to said acceleration/deceleration start signal, and sets said frequency and said gain back to said normal levels in response to said acceleration/deceleration end signal.

6. A motor driving apparatus as claimed in claim 5, wherein said AC/DC converter further includes a temperature sensor for sensing the temperature of said power switching device, and wherein
   when the temperature sensed by said temperature sensor is higher than a predetermined value, said frequency/gain varying unit does not set said frequency and said gain higher than said normal levels even during the period that the load for said DC/AC converter varies.

7. A motor driving apparatus as claimed in claim 1, wherein when said error exceeds a first threshold value, said frequency/gain varying unit sets said frequency and said gain higher than said normal levels, and when said error decreases to or below a second threshold value which is smaller than said first threshold value, said frequency/gain varying unit sets said frequency and said gain back to said normal levels.

8. A motor driving apparatus as claimed in claim 7, wherein said AC/DC converter further includes a temperature sensor for sensing the temperature of said power switching device, and wherein
   when the temperature sensed by said temperature sensor is higher than a predetermined value, said frequency/gain varying unit does not set said frequency and said gain higher than said normal levels even during the period that the load for said DC/AC converter varies.

* * * * *